United States Patent [19]

Pearce

[11] 4,190,260
[45] Feb. 26, 1980

[54] WHEELBARROW APPARATUS

[76] Inventor: Junior B. Pearce, 670 S. 14th Ave., Yuma, Ariz. 85364

[21] Appl. No.: 936,530

[22] Filed: Aug. 24, 1978

[51] Int. Cl.² .............................................. B62B 1/18
[52] U.S. Cl. ............................ 280/47.31; 280/47.33; 280/755
[58] Field of Search ................ 280/47.31, 47.33, 47.3, 280/47.32, 78, 755

[56] References Cited

U.S. PATENT DOCUMENTS

| | | | |
|---|---|---|---|
| 258,323 | 5/1882 | Shumaker | 280/47.33 |
| 264,637 | 9/1882 | Devey | 280/47.31 X |
| 1,622,354 | 3/1927 | Smith | 280/47.31 |
| 1,648,374 | 11/1927 | Walker | 280/47.31 X |
| 1,691,390 | 11/1928 | Hanan | 280/78 |
| 1,965,409 | 7/1934 | Forrer | 280/47.31 |
| 2,010,975 | 8/1935 | Carter | 280/47.31 |
| 2,012,656 | 8/1935 | Bremner | 280/47.31 |
| 2,757,937 | 8/1956 | Illsley | 280/47.33 |
| 3,552,760 | 1/1971 | Sine | 280/47.31 X |
| 3,977,477 | 8/1976 | Wise | 280/47.31 X |

FOREIGN PATENT DOCUMENTS

| | | | |
|---|---|---|---|
| 514123 | 11/1920 | France | 280/47.31 |
| 2302898 | 10/1976 | France | 280/78 |
| 163615 | 5/1921 | United Kingdom | 280/755 |

Primary Examiner—Joseph F. Peters, Jr.
Assistant Examiner—Milton L. Smith
Attorney, Agent, or Firm—H. Gordon Shields

[57] ABSTRACT

Wheelbarrow apparatus includes a generally rectangular box disposed over the axle of a single front wheel with a pair of outrigger stabilizers extending downwardly and outwardly from adjacent the wheel to prevent tipping of the wheelbarrow apparatus, and the main frame of the apparatus, to which both the box and the wheel are secured, includes an upwardly and outwardly extending portion which define the handles of the apparatus.

8 Claims, 6 Drawing Figures

WHEELBARROW APPARATUS

BACKGROUND OF THE INVENTION

1. Field of the Invention:

This invention relates to wheelbarrow apparatus and, more particularly, to wheelbarrow apparatus having a generally rectangular box disposed partially over the axle of the wheel.

2. Description of the Prior Art:

As is well known, wheelbarrows have been used for hauling purposes by individuals for many, many years. Wheelbarrows of the prior art comprise a single wheel, which is the pivot point or fulcrum for a single lever arrangement. The load for the wheelbarrow, which may either be a generally flat bed or surface or a box of any of a variety of configurations, depending on the specific purpose for which the box is designed, in terms of cargo, is generally disposed between the front wheel and the rear handles. The user grasps the handles, lifts on the handles, and then moves the wheelbarrow on the single front wheel. The load is thus distributed between the individual operating the wheelbarrow and the pivot point or fulcrum.

With respect to the prior art, the load is generally disposed between the axle or fulcrum and the user of the apparatus for stability purposes. If a portion of the load of the prior art wheelbarrows were to be distributed on or forwardly of the pivot point or fulcrum, instability of the apparatus would result.

An example of the prior art is shown in U.S. Pat. No. 258,323, patented May 23, 1882. The patent shows a relatively flat bed disposed between the wheel and the handles of the apparatus. The distance between the bed and the handles is minumum, which maximizes the force required to lift the load on the bed.

U.S. Pat. No. 1,622,354, issued Mar. 29, 1927, discloses another example of prior art wheelbarrows. The wheelbarrow apparatus of the U.S. Pat. No. 1,622,354 includes a relatively long, straight frame extending from the wheel and terminating at handle grips. The bed of the wheelbarrow apparatus is of a generally teardrop configuration, with the front portion and the rear portion squared off. The widest portion of the box is disposed adjacent the wheel, and a relatively small portion of the box extends over the wheel.

U.S. Pat. No. 1,648,374, issued Nov. 8, 1927, discloses a variation of the apparatus of the U.S. Pat. No. 1,622,354. The frame in the U.S. Pat. No. 1,648,374 is quite similar to that of the U.S. Pat. No. 1,622,354, and the box is of a very similar configuration also, including a portion of the box which extends over the front wheel. However, as in both the U.S. Pat. No. 1,622,354 and the U.S. Pat. No. 1,648,374, the main load of the box is disposed between the wheel and the handles. The U.S. Pat. No. 1,648,374 patent includes a scraper for scraping the wheel of the wheelbarrow, and a portion of the scraper comprises a brace for bracing the frame and the box.

U.S. Pat. No. 1,965,409, issued July 3, 1934, discloses a frame similar to that of the U.S. Pat. Nos. 1,622,354 and 1,648,374. The frame extends straight rearwardly and slightly upwardly from the wheel and terminates in a pair of handles. A relatively large box is employed with the U.S. Pat. No. 1,965,409 apparatus, with a portion of the box extending upwardly and forwardly to terminate with a small portion of the box over the front wheel. The box also extends rearwardly and upwardly to terminate ahead of the handle grips.

U.S. Pat. No. 2,010,975, issued Aug. 13, 1935, discloses wheelbarrow apparatus similar in general configuration to the apparatus of both the U.S. Pat. Nos. 1,622,354 and 1,648,374, with a portion of the box extending forwardly to terminate over the wheel. However, as with all of the prior art patents, the U.S. Pat. No. 2,010,975 discloses wheelbarrow apparatus in which the box itself is disposed between the wheel and the handle grips, which comprise the rear portion of a straight frame. The box is secured to the frame between the wheel and the handle bars.

The leg or support structure of all of the prior patents discussed above comprises a generally triangular brace extending downwardly from the frame beneath the box. The patents include a single brace connected to each side of the frame and secured to the frame in two places, with the two arms of the support terminating at the lowest portion of the brace in a foot portion.

U.S. Pat. No. 3,552,760, issued Jan. 5, 1971, discloses a folding wheelbarrow with a curved frame extending rearwardly and upwardly from the wheel. The frame is in two portions, which terminate in a pair of handle grips. The leg braces for the U.S. Pat. No. 3,552,760 comprise a single pair of legs, one of which extends downwardly at an oblique angle to terminate beneath the opposite side of the frame, thus defining, from the front and rear, an "X" shaped support. A portion of the box extends over the front wheel, but, as with all of the prior art wheelbarrows, the main portion of the box itself is secured to the frame between the wheel and the handle grips.

A more curved frame is illustrated in U.S. Pat. No. 3,977,477, issued Aug. 31, 1976. However, the apparatus of the U.S. Pat. No. 3,977,477 comprises a combination wheelbarrow and soil working apparatus, with the difference between the two uses being simply in inverting the apparatus. That is, in one configuration, the U.S. Pat. No. 3,977,477 apparatus comprises a wheelbarrow, and, if the apparatus is inverted, it then becomes a soil-working implement. Thus, the reason for the curved frame appears to be for convenience in inversion for dual usage.

SUMMARY OF THE INVENTION

The wheelbarrow apparatus of the present invention comprises a generally rectangular box disposed on a frame with a portion of the box extending over and forwardly of the wheel axle and the remainder of the box extending rearwardly toward the handles, which comprise an upwardly extending portion of the frame. A pair of stabilizer feet extend downwardly and outwardly from adjacent the wheel to prevent the wheelbarrow apparatus from tipping sideways.

Among the objects of the present invention are the following:

To provide new and useful wheelbarrow apparatus;

To provide new and useful wheelbarrow apparatus including a generally rectangular box;

To provide new and useful wheelbarrow apparatus in which the box is disposed over and forwardly of the wheel axle;

To provide new and useful wheelbarrow apparatus having a curved frame with the handles extending upwardly above the box;

To provide new and useful wheelbarrow apparatus having a pair of stabilizing feet;

To provide new and useful wheelbarrow apparatus capable of being taken apart and stored entirely within the box;

To provide new and useful wheelbarrow apparatus in which a substantial portion of the load is above and forwardly of the wheel axle; and To provide new and useful wheelbarrow apparatus having several stable positions of rest.

DESCRIPTION OF THE PREFERRED EMBODIMENT

Figure 1:
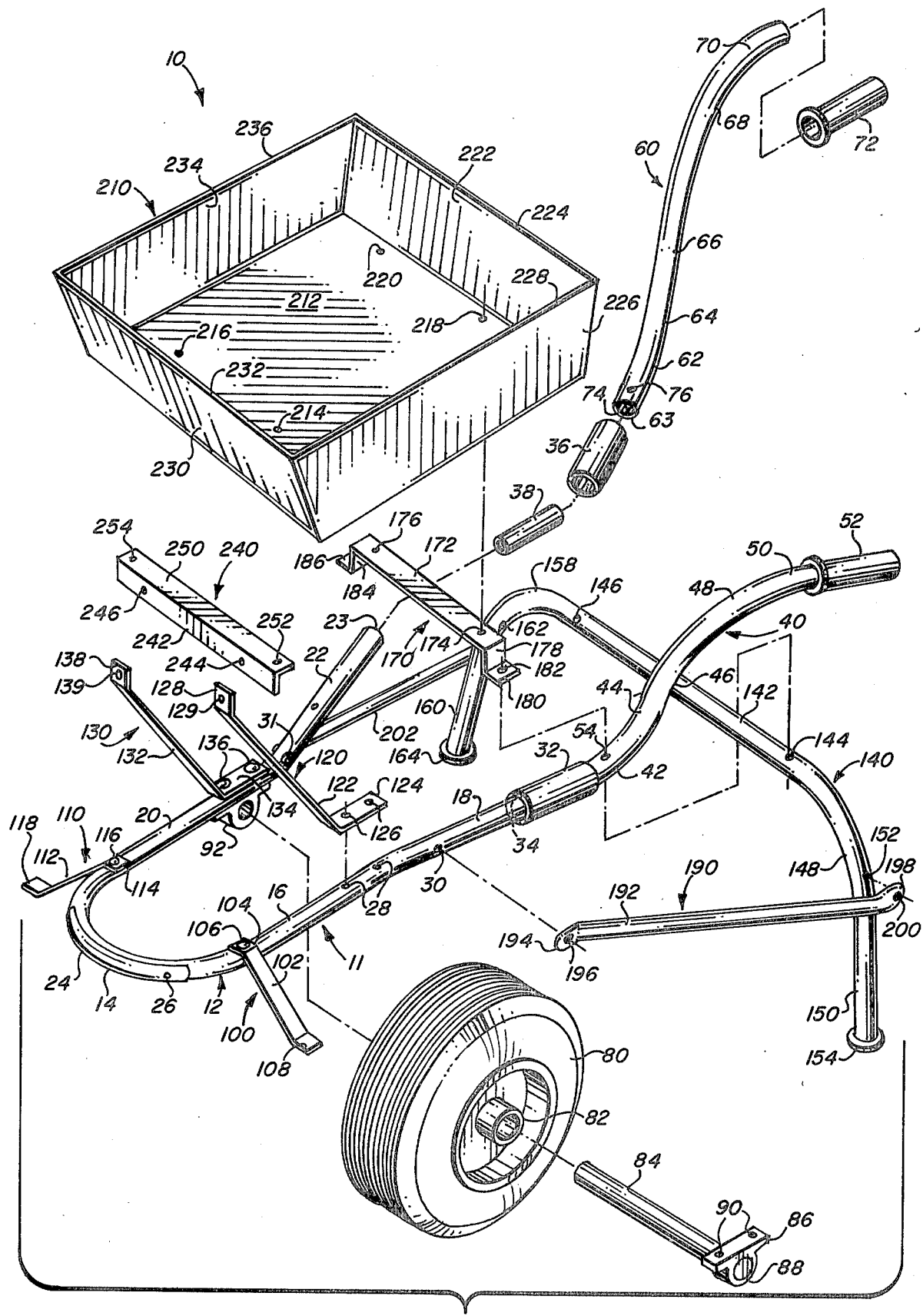
FIG. 1 is a partially exploded perspective view of apparatus of the present invention, showing the various components or elements thereof.

FIG. 1 is a perspective view of wheelbarrow apparatus 10 of the present invention, showing some of the various elements or components of the apparatus separated or "exploded" for convenience of illustrating the assembly of the various components or elements. The wheelbarrow apparatus 10 may be considered as comprising, broadly, a frame 11, a wheel 80 secured to the frame, a pair of handles 40 and 60 secured to the frame, and a box 210 secured to the frame over the wheel. The arrangement of the various portions or elements of the frame and the configuration of the box provides a wheelbarrow 10 of exceptional stability and load-carrying capability which is easily handled, even with a full load.

The wheelbarrow apparatus 10 includes a generally U-shaped front frame member 12, which is preferably a single or unitary piece of tubular steel. The front frame member 12 includes a round front nose portion 14 and a pair of sides or arms 16 and 20. The sides 16 and 20 extend from, and comprise a continuation of, the rounds or curved nose portion 14. Rearwardly of the generally parallel side arm portions 16 and 20 are a pair of upwardly and outwardly extending side arm portions 18 and 22, which comprise continuations of the frame arms 16 and 20, respectively.

A protective bumper 24 is secured to the nose portion 14 by appropriate fasteners 26, such as screws or bolts. The bumper 24 may be made of rubber or heavy plastic, etc. A pair of handles 40 and 60 are secured to the upwardly and outwardly extending arm portions 18 and 22 of the front frame member 12, respectively.

The handles are substantially identical, and comprise a generally elongated "S" shaped tubular member. The handle 40 includes a lower front portion 42, and an upwardly curved portion 44 which extends from the front portion 42 to a relatively short transision portion 46. The transition portion is relatively straight, and comprises simply a transition from the upwardly curved portion 44 to another, an outwardly curved portion 48. The outwardly curved portion 48 then extends to a rear end portion 50, which is relatively straight. A grip 52 is secured to the rear end 50 for convenience of holding the handle.

The handle 60 is substantially identical to the handle 40. It includes a lower front portion 62 which is relatively straight and which extends to an upwardly curved portion 64. The upwardly curved portion 64, like the upwardly curved portion 44 of handle 40, is a double curve in that it curves upwardly and outwardly and extends to a relatively short and straight transition portion 66. The transition portion 66 in turn extends to another outwardly curved portion 68 which is substantially the reverse of the curved portion 64. The outwardly curved portion 68 curves in the reverse direction with respect to the curved portion 64. A rear end portion 70 comprises the termination of the handle 60. A grip 72 is shown spaced apart from the rear end 70.

Figure 6:
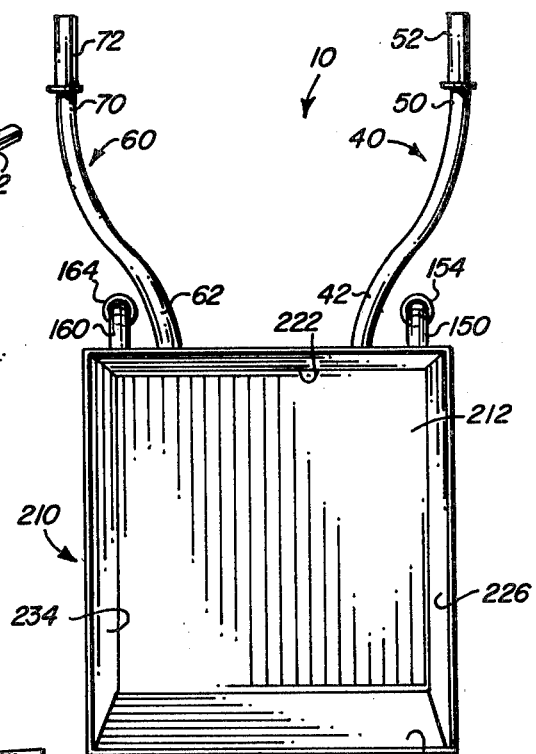
FIG. 6 is a top plan view of the wheelbarrow apparatus of the present invention.

The above described curvatures of the handles 40 and 60 have been described relative to the vertical. This may best be understood by referring to FIGS. 3, 4, and 5, in which the wheelbarrow apparatus 10 is shown in various side views. Since the handles comprise extensions of the side portions of the frame 11, they are also oriented laterally, or outwardly and inwardly with respect to the sides of the apparatus. This is best shown in FIG. 6. The handles continue generally outwardly or away from each other as they extend rearwardly. They then curve generally inwardly or the reverse of their outward curve until they are about parallel to each other, and spaced apart slightly greater than the width of box 210.

The handles 40 and 60 are each secured to the frame 12 by means of a pair of elements including a pair of sleeves 32 and 36, and an inner reinforcing member secured to each sleeve and handle. An inner reinforcing member 38 is shown spaced apart from the sleeve 36. For handle 40 and the left side arm 16, and its upwardly extending portion 18, an inner reinforcing member 34 is shown in phantom disposed within a portion of the member 18 and the front handle portion 42. With the right handle 60 shown exploded or taken apart, the inner reinforcing member 38 is shown spaced apart from the sleeve 36 and the portion 22 of the side arm 20. The portion 62 of the handle 60 includes an aperture 76 extending upwardly through the portion 62. The aperture 76 mates with a similar aperture in the sleeve 36 and in the reinforcing member 38, and the aligned apertures receive a screw which secures the three elements together. The outer diameter of the reinforcing element 38, which is a tubular member, is substantially the same as the inner diameter of the handle portion 62. Accordingly, the element 38 extends into the handle portion 62 a substantial distance so as to overlap the juncture of the elements 22 and 62. The inner diameter of the sleeve 36 is substantially the same as the outer diameter of the handle portion 62 and the frame portion 22. Accordingly, a rear end portion 23 of the frame arm 22 is disposed against an end 63 of the handle portion 62, with a portion of the inner reinforcing member or element 38 extending into both frame arm portion 22 and handle portion 62. The sleeve 36 in turn extends over the juncture of the ends 23 and 63 for double reinforcement of the juncture of the frame and the handle. It will be noted that while the handle portion 62 is secured as by the screw discussed above to both the sleeve and the inner reinforcing element 38, there need not be a similar securement between or with respect to the frame portion 22 since the handle, the frame, and the box are secured together as discussed below.

A wheel 80 is secured to the front frame member 12. The wheel 80 includes a hub 82 through which an axle 84 extends. The axle, hub, and wheel are well known elements, and their employment herein is known and understood. A bearing block 86 is shown secured to the axle 84. The bearing block 86 includes a bushing 88 in which the axle 84 rotates. A pair of apertures 90 extend through the block 86. The apertures 90 are aligned with a pair of apertures 28 which extend through the side arm 16 of the frame 12. The aligned apertures 28 and 90 receive appropriate bolts to secure the wheel and axle to the frame element 16.

A bearing block 92 is shown secured to the side arm 20 of the frame 12 by a pair of bolts 136. The bearing blocks 86 and 92 are secured to the bottom or lower portion of the frame 12.

The same bolts and apertures in the frame and bearing blocks which secure the wheel to the frame are also used to secure a pair of brackets 120 and 130 to the frame arms 16 and 20. The brackets 120 and 130 are substantially identical. Each includes a center portion 122 and 132, respectively, which extends upwardly and forwardly from the frame arms 16 and 20, respectively. The center portions are relatively elongated as compared to a pair of lower flanges 124 and 134, which extend rearwardly from the center portions, respectively. The flange 124 includes a pair of holes or apertures 126 which are aligned with the apertures 28 in the side arm 16 and bearing block 86, respectively. Similarly, the flange 134 includes a pair of apertures which are aligned with apertures in the side arm 20 and in the block 92 to receive the bolts 136 to secure the bracket 130 and the block 92 to the side arm 20 of the frame 12.

The arm 120 terminates in a generally vertically extending flange 128 which includes a hole 129 extending through the flange. Similarly, the center portion 132 of the bracket 130 includes a generally upwardly or vertically extending flange 138 which has a hole 139 extending through the flange. The arms 120 and 130 are used to support and secure box 210 to the frame, as discussed below.

Forwardly of the brackets 120 and 130 with respect to the front frame member 12 are a pair of outwardly and downwardly extending stabilizers 100 and 110. The stabilizers 100 and 110 are both secured to the front frame member 12 at forward portions of the side arms 16 and 20, respectively. The stabilizer 100 includes a relatively elongated center or central portion 102 which extends between an upper flange or pad 104 and a lower outwardly extending flange or pad 108. The upper flange 104 includes a hole 106 extending through the pad. The hole 106 mates with a pair of aligned holes which extend through the side arm 16 and the aligned holes receive a bolt which secures the stabilizer 100 to the arm 16.

The stabilizer 110 is substantially identical to the stabilizer 100. It includes an elongated portion 112 which extends between an upper flange or pad 114 and a lower flange or pad 118. The flange 114 includes an aperture or hole 116 which receives a bolt and which bolt extends through a pair of aligned holes in the arm 20 of the front frame member 12.

The upper and lower pads of the stabilizers extend in opposite directions from each other for obvious reasons and purposes. The lower flanges or pads are generally larger than the upper flanges or pads, and they comprise feet on which the wheelbarrow apparatus may rest for stability purposes.

Figure 3:
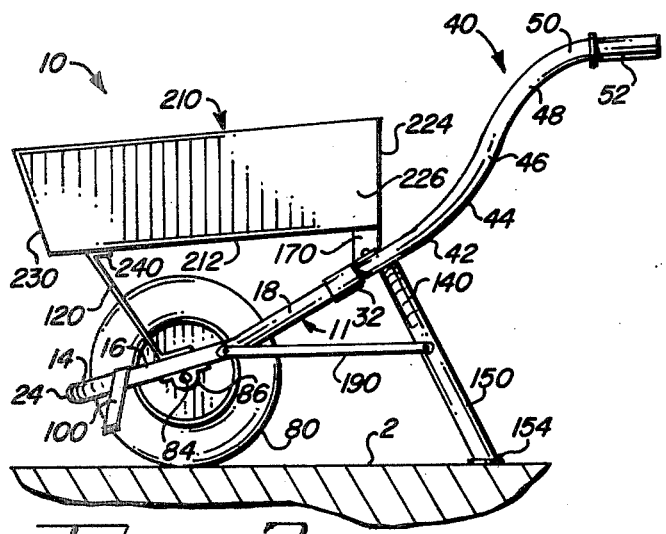
FIG. 3 is a side view of the apparatus of the present invention.

The effective length of the stabilizers, in terms of vertical distance, from the frame downwardly, is less than the distance from the frame to the bottom of the wheel 80, and accordingly the stabilizers are disposed above the bottom of the wheel, as best shown in FIG. 3, when the wheelbarrow is being used. It is only when the wheelbarrow apparatus 10 is tipped to one side or the other that the stabilizers make contact with the ground or surface over which the wheelbarrow apparatus is moving or on which it is disposed.

The stabilizers prevent the wheelbarrow apparatus 10 from inadvertently tipping completely over on a side and accordingly from spilling whatever load the wheelbarrow apparatus is being used to transport. That is, if, for some reason, the user of the wheelbarrow apparatus 10 inadvertently or otherwise loses control or tips the wheelbarrow apparatus on its side and forwardly, the wheelbarrow apparatus will not fall over but rather will be prevented from falling and accordingly from spilling its load by the stabilizers 100 and 110 or by one of the stabilizers, depending on which side the apparatus is tipped. The pads 108 and 118 will thus contact the ground or surface, depending on which side the apparatus is tipped, to prevent the load from spilling and the wheelbarrow from falling completely over on its side.

The rear of the wheelbarrow apparatus 10 is supported by a rear leg bracket 140 which is a generally U-shaped member having a relatively wide or long center portion 142 and a pair of outwardly and downwardly extending legs 150 and 160. A pair of apertures 144 and 146 extend through the center portion 142 of the leg bracket 140. Since the leg bracket 140 is preferably made of tubular steel, as are the other various frame members and handles, except for certain brackets and stabilizers, as discussed heretofore and below, the apertures 144 and 146 actually each comprise a pair of apertures which extend diametrically through the tubular center portion 142. At the outer ends of the center portion 142 are curved portions 148 and 158 which extend between the center portion and the pair of legs 150 and 160. The curved portions 148 and 158 are preferably greater than ninety degrees, measuring downwardly and outwardly from the center portion 142, so that the legs 150 and 160 extend generally downwardly and outwardly with respect to the center portion 142.

Figure 2:
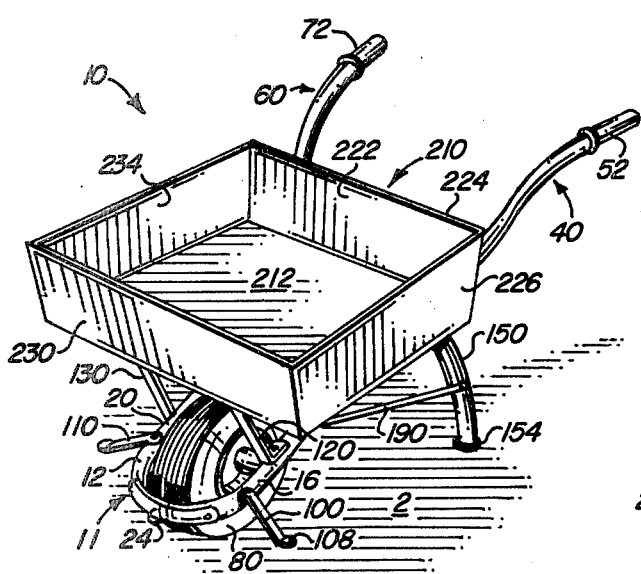
FIG. 2 is a perspective view of the assembled apparatus of the present invention.

The leg 150 includes an aperture(s) 152 extending diametrically through the leg 150 adjacent the curved portion 148. The leg 160 includes a similar aperture(s) 162 extending diametrically through the leg 160 adjacent the curved portion 158. A pair of pads 154 and 164 are secured to the bottom of the legs 150 and 160, respectively. The pads are appropriately secured to the legs. They comprise feet on which the apparatus rests, in the common, typical three point orientation of a wheelbarrow apparatus, such as shown in FIGS. 2 and 3 herein.

Each aperture 144 and 146 actually comprises a pair of aligned and diametrically extending apertures which receive bolts to secure together the leg bracket 140, the handles 40 and 60, and the box 210.

Figure 4:
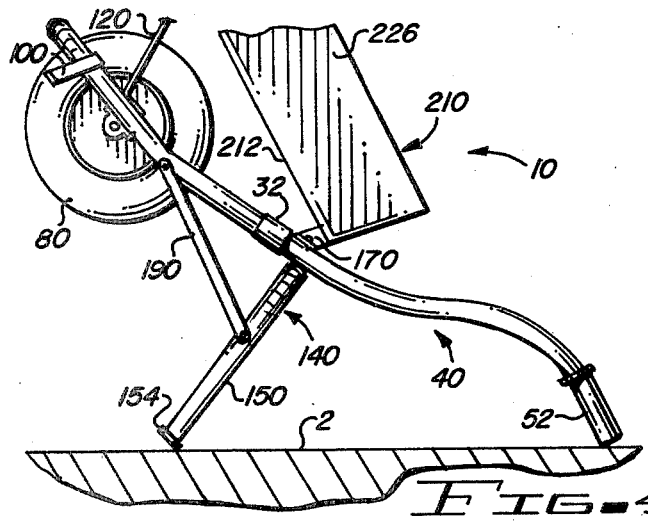
FIG. 4 is a side view of the wheelbarrow apparatus of the present invention with the apparatus tilted rearwardly to illustrate the stability of the apparatus.
Figure 5:
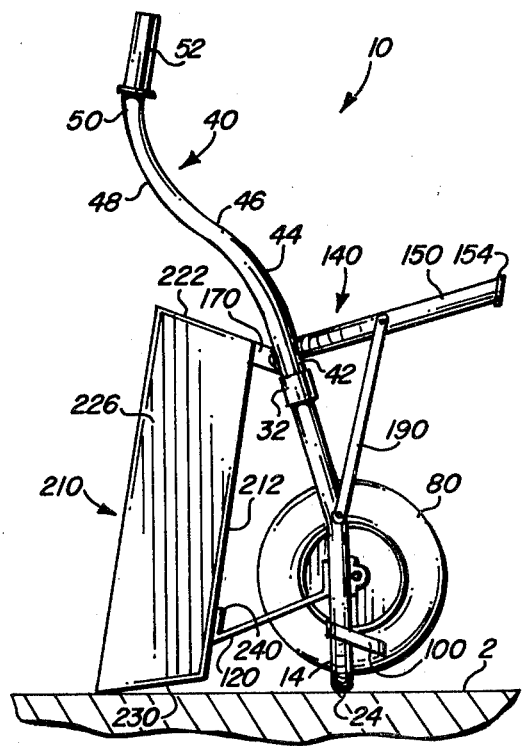
FIG. 5 is a side view of the wheelbarrow apparatus of the present invention with the apparatus in the forward or dump position.

Between the box 210 and the leg bracket or assembly 140 is a support bracket 170. The bracket 170 includes an elongated center portion 172 with a pair of arms 178 and 184 extending downwardly substantially perpendicular to the center portion 172 from the outer ends of the center portion. A pair of apertures 174 and 176 are spaced apart on the center portion 172 and extend through the center portion. A pair of pads 180 and 186 are secured to, and extend outwardly from, the legs 178 and 184, respectively. The pads 180 and 186 extend outwardly in planes substantially perpendicular to the legs 178 and 184, but the pads, or the planes of the pads, are not parallel to the center portion 172. Rather, they are disposed at an angle with respect to the center portion 172, as is best shown in FIGS. 3, 4, and 5. The pads 180 and 186 include an aperture extending through each pad. An aperture 182 is shown extending through the pad 180. When the bracket 170 is secured to the wheelbarrow apparatus, the aperture 182 is aligned with the aperture(s) 54 which extends through the forward or front portion 42 of the handle 40. Both apertures 182 and 54 are then aligned with aperture(s) 144, which extends through the center portion 142 of the leg bracket or assembly 140. An appropriate fastener, such as a bolt, is then placed through the aligned apertures and secured in place. Similarly, a bolt is placed through the aperture (not shown) which extends through the pad 186, and through an aperture, or diametrically extending pair of apertures 76, in the front portion 62 of the right handle 60, and through the aperture(s) 146 in the rear leg bracket or assembly 140. In this manner, the handles are secured to the leg bracket or assembly, and the bracket 170 is secured to both the handles and the leg assembly.

The box 210 is a generally rectangular box which includes a rather flat, rectangularly shaped bottom 212. The bottom 212 includes four apertures extending through it, all of which are spaced apart and aligned. A pair of apertures 214 and 216 extend through the front or forward portion of the box 210. Another pair of apertures 218 and 220 extend through the rear of the bottom portion 212 of the box 210.

The box 210 is secured to the leg and arms by appropriately bolting together the box 210 and the bracket 170. The aperture 218 on the bottom 212 of the box 210 is aligned with aperture 174 in the center portion 172 of the bracket 170. Similarly, aperture 220 in the bottom 212 of the box is aligned with aperture 176 of the center portion 172 of the bracket 170. Appropriate bolts are then used to secure the box 212 to the bracket 170. The securing of the bracket 170 to the arms 40 and 60 and the leg bracket or assembly 140 has previously been discussed. The box, legs, and rear part of the frame are thus secured together. As best shown in FIG. 3, which comprises a side view of the assembled wheelbarrow apparatus 10, the box 210 is disposed nearly horizontally, with the lower front portion of the box a bit lower than the rear portion.

The front portion of the box 210 is secured to an angle iron bracket 240, and the bracket 240 is in turn secured to the brackets 120 and 130. The bracket 240 comprises a length of angle iron which includes a pair of arms or flanges 242 and 250 disposed at substantially a right angle with respect to each other. The arm 242 of the bracket 240 extends generally downwardly and it includes a pair of apertures 244 and 246 which extend through the arm 242. The apertures 244 and 246, when the bracket 240 is assembled to the brackets 120 and 130, are aligned with the apertures or holes 129 and 139 which extend through the pads 128 and 138, respectively. Bolts or other appropriate fasteners may be used to secure the bracket 240 to the brackets 120 and 130 through the aligned apertures.

A generally horizontal arm or flange 250 is secured to the arm 242 at substantially a right angle to the arm 242. A pair of apertures 252 and 254 are spaced apart from each other and they both extend through the arm 250. When the box is assembled, the aperture 214 of the box 210 is aligned with the aperture 252 of the arm 250, and the aperture 216 of the box 210 is aligned with aperture 254 of the bracket 240. Appropriate fastening means, such as bolts, are used to secure the bracket 240 to the bottom 212 of the wheelbarrow apparatus 10.

The apertures 244 and 246 are spaced apart on the arm 242 and they are aligned with the apertures 129 and 139 of the brackets 120 and 130, respectively, to secure the bracket 240 to the brackets 120 and 130. Thus, the box 210 is secured to the bracket 240, and the bracket 240 is secured to the brackets 120 and 130, and the brackets 120 and 130 are in turn secured to the frame. It will be noted that the box 210 is secured to the frame through brackets, rather than being secured directly to the frame. The use of the brackets provides a relatively level box when the apparatus is being used, and allows the box to be disposed above, and forwardly of, the wheel 80 for weight distribution purposes.

The box 210 includes four sides which extend upwardly from the box. At the rear of the box 210 is a rear end wall 222 which extends upwardly from the bottom 212 at an angle which is slightly greater than perpendicular. The rear end wall 222 terminates upwardly a relatively short distance in a top edge 224. The wall 222 is appropriately secured to the bottom 212.

A left side wall 226 is connected to both the bottom 212 and the rear end wall 222. The side 226 also terminates above the bottom 212 in a top edge 228.

The forward portion of the box 210 is defined by a front end wall 230. The front wall 230 extends upwarly with respect to the bottom 212 at an obtuse angle, which is greater than the angle between the bottom 212 and the rear end wall 222. That is, the front end wall 230 includes a greater forward slope, with respect to the bottom 212, than the rear slope of the rear end wall 222, also with respect to the bottom 212. The front end wall 230 terminates upwardly in a top edge 232.

The fourth side wall for the box 210 is a right side wall 234. The right side wall 234 terminates upwardly, above the bottom 212 and a top edge 236. The side walls 226 and 234 may include a slightly outwardly extending taper with respect to the bottom 212, simply for ease of loading and unloading the box. However, the outward taper of the side walls, if they have any, is substantially less than the rearward taper of the rear end wall 222, and the forward taper of the front wall 230, with respect to the bottom or floor 212. The top edges 224, 228, 232, and 236 are in the same plane, defining a continuous top edge for the box 210.

As clearly shown in FIG. 1, and also in FIGS. 2 and 6, the four side walls and end walls of the box 210 are all appropriately connected to the bottom 212, and adjacent walls are connected to each other to define a slightly irregular rectangular box. The box is relatively wide, and relatively shallow, as compared with prior art wheelbarrows. Moreover, when the wheelbarrow apparatus is in a static position, such as shown in FIGS. 2 and 3, the box 210 is relatively level with respect to the surface on which the apparatus is disposed. The relatively wide and long rectangular box, even though somewhat shallow in appearance, has substantially the same capacity, with respect to volume, as does the familiar prior art wheelbarrow typically referred to as a "contractor" type wheelbarrow. However, with the box, and accordingly the load, disposed forwardly of the wheel, and over the wheel, as well as rearwardly of the wheel, the wheelbarrow apparatus 10 is easier to lift, move, and manuever, and more difficult to inadvertently tip, than prior art wheelbarrows. Moreover, the relatively large, flat bottom of the box distributes the weight of the load over a relatively large area. In case of inadvertent tipping, the wide distribution of weight does not result in a concentration of the load weight which tends to increase the tipping, as with prior art wheelbarrows. Rather, the wide distribution tends to aid in keeping the load balanced and thus aids in recovery from such inadvertent tipping. In addition, if the wheelbarrow apparatus 10 is tipped sideways, one of the stabilizers 100 or 110 will contact the ground or surface and will prevent the apparatus from tipping completely over. Again, the configuration of the box, generally rectangular, with the width almost the same, dimension-wise, as the length, and with relatively low sides, results in the distribution of the load over a relatively large area, but low in height, so as to spill only a minimum amount out of the box when the wheelbarrow apparatus 10 is tipped and resting on a stabilizer.

A pair of side braces 190 and 202 are secured between the frame and the legs to provide structural integrity for the apparatus 10. The left side brace 190 is shown spaced apart from the left frame element 18 and from the left leg 150. The brace 190 comprises a length of steel strap which includes a relatively elongated center portion 192, with a pair of end flanges 194 and 198 extending from the center portion 192.

The flange 194 includes an aperture 196 extending therethrough. The aperture 196 is aligned with the aperture(s) 30 in the upwardly and outwardly extending arm portion 18 of the frame. The aligned apertures receive appropriate fastening means, such as a bolt, to secure the brace 190 to the frame 12.

The flange 198 is preferably curved to mate with a portion of the circular leg 150. The radius of curvature of the flange 198 accordingly is essentially the same as the radius of curvature of the outside of the leg 150. The flange 198 includes an aperture 200 extending through the flange which is aligned with aperture(s) 152 which extends through the leg 150. An appropriate fastener, such as a bolt, extends through the apertures 200 and 152 to secure the brace 190 to the leg 150.

The brace 202 is substantially identical to the brace 190 and is secured to the frame in the same manner. FIG. 1 shows an aperture(s) 31 which extends through the arm portion 22 of the frame 11. The aperture(s) 31 is aligned with a mating aperture on the brace 22 and the aperture(s) then receives a fastener, such as a bolt, as heretofore discussed, to secure the brace 202 to the frame 11. Similarly, the leg 160 is shown as including an aperture(s) 162 which is aligned with an aperture on the brace 202 for receiving a fastener to secure the brace 202 to the leg 160.

With the braces 190 and 202, the frame 11 and the rear leg brace 140 are appropriately secured together at a total of six points, three points for each side of the frame 11.

FIG. 2 is a perspective view of the assembled apparatus of FIG. 1. It comprises a view of wheelbarrow apparatus 10 of the present invention showing the wheelbarrow apparatus 10 in the conventional three point static or rest position on a surface 2, awaiting filling or use, or the like.

The box 210 is shown supported at its front, adjacent the front panel 230, by a pair of brackets 120 and 130. The brackets 120 and 130 are in turn secured to the frame 11. The frame 11 includes the generally "U" shaped front frame member 12 and a pair of side frame members 16 and 20. The outrigger braces 100 and 110 are secured to the side members 16 and 20, respectively. The brackets 120 and 130 are also secured to the frame members 16 and 20, respectively. The brackets 120 and 130 are, as shown in FIG. 1 and also in FIGS. 3, 4, and 5, below, secured to the frame 11 at the same location that the wheel bearing block 86 is secured to the frame.

The left brace member 190 is shown extending from the frame to the left leg 150. At the bottom of the leg 150 is the pad 154. Rearwardly of the box 210, and extending upwardly, are the handles 40 and 50, with their respective grips 52 and 72.

From FIG. 2, and also from FIG. 6, it may be seen that the box 210 comprises a generally long and relatively wide rectangularly configured receptacle for receiving material to be hauled. The bottom 212 and the four sides are generally flat or planar, and the four walls extend upwardly nearly vertically from the bottom 212. While the walls are not parallel to each other, and accordingly are not perpendicular to the bottom 212, their angular orientation with respect to the bottom 212 is relatively small as compared with prior art wheelbarrows. The rear wall 222 extends rearwardly from the bottom 212 at an angular orientation which is slightly greater than perpendicular. The front wall 230 extends forwardly from the bottom 212 at an angular orientation which is also preferably slightly greater than perpendicular, and slightly more than the rearwardly orientation of the back wall 224. The left and right side walls 226 and 234, respectively, also extend outwardly from the bottom 212 at an angular orientation which is just slightly greater than perpendicular. It will be noted that the height of the four walls is comparatively shallow or low, especially with respect to the width and length of the box. However, as discussed above, the capacity of the box 210 is substantially the same as the conventional "contractors" wheelbarrows in common usage.

FIGS. 3, 4, and 5 are side views of the wheelbarrow apparatus 10 in various orientations, illustrating stable positions of the wheelbarrow apparatus. FIG. 3 is a side view of the wheelbarrow apparatus 10 shown in the conventional down or static position awaiting use. The wheelbarrow apparatus in FIG. 3 is shown in the three-point suspension, with the apparatus resting on its wheel 80 and on its leg bracket 140, with only the left leg 150 shown. Since FIGS. 3, 4, and 5 are all side views of the apparatus, only the left structural elements are shown and are thus specifically identified.

In FIGS. 3, 4, and 5, the angular orientation of the various frame members is shown, such as the angular orientation between the left side member 16 and the upwardly extending side member 18 connected to the side member 16. In turn, the side member 16 is a continuation of the rounded front nose member 14 of the "U" shaped frame member 12.

The sleeve 32 which covers the juncture between the side arm 18 and the front portion 42 of the left handle 40 is shown in FIGS. 3, 4, and 5. The sleeve 32 has been discussed above in conjunction with FIG. 1. Rearwardly of the front portion 42 of the handle 40 is the curved portion 44, sequentially followed by the relatively straight, but short, transition portion 46 and the curved portion 48 which extends to the rear portion 50.

The curved portions 44 and 48 extend in reverse direction with respect to each other and to the straight transition portion 46 between them. The handle 40 terminates at the straight rear portion 50, which is disposed above the top of the box 210. The handle grip 52 is disposed about the end 50, for convenience, as discussed above.

The leg bracket 140 is secured to the frame 11 just rearwardly of the juncture of the upwardly extending side arm member 18 and the front portion 42 of the handle 40, which is covered by the sleeve 32.

The bracket 190 extends between the frame 11 and the leg 150. The bracket 190 is secured to the leg 150 and also to the side arm member 16. As clearly illustrated in FIG. 3, the leg bracket 140 extends rearwardly and downwardly from the frame 11 at the juncture of the bracket 170 with the frame 11, adjacent to, but slightly rearwardly of, the sleeve 32. This is also illustrated in FIG. 1.

The box 210 is supported on the frame by the bracket 170 at the rear of the box, adjacent the rear wall 224, and by the brackets 120 and 130 (see FIGS. 1 and 2) adjacent the forward wall 230 of the box 210. As thus illustrated in FIG. 3, the box is generally horizontally disposed when the wheelbarrow is in the down or static position shown in FIG. 3, with a slight downward tilt of the bottom 212 towards the front of the wheelbarrow apparatus. The left outrigger or stabilizer 100 is shown in FIG. 3 as extending downwardly and somewhat forwardly from the side member 16, but terminating above the ground 2 on which the wheelbarrow apparatus 10 is disposed. The left side stabilizer 100, and also the right side stabilizer 110, as shown in FIGS. 1 and 2, does not interfere with the normal movement, including turning and tipping, such as shown in FIG. 5, of the wheelbarrow apparatus. The stabilizer 100 or the stabilizer 110 makes contact with the ground or surface 2 to prevent the wheelbarrow apparatus from tipping completely over. Thus, when tipped either to the left or to the right, and when one of the stabilizers makes contact with the ground or surface on which the apparatus is disposed, the wheelbarrow apparatus 10 is in a stable position, comprising a three-point suspension, defined by the wheel, one of the legs, and one of the stabilizers. In such stable position the box 210, with its cargo, is maintained in a relatively safe attitude with respect to the spilling of the cargo from the box. Moreover, the particular configuration of the box, even when full, helps to prevent the wheelbarrow apparatus from being unstable and aids in correcting a momentary slip or lateral tip or tilt due to the wide area over which the cargo is dispersed. The weight of the cargo is spread over a relatively large area of ease of balancing and helps to conteract a tilt to one side or the other which, in prior art wheelbarrows, results in complete tipping and spilling.

Another feature of the wheelbarrow apparatus 10 is illustrated in FIG. 3. That feature is the orientation of the box 210 with respect to the wheel 80 and its axle 84. A line extending perpendicular to the surface of the ground 2 through the axle 84 (the pivot point) intersects the bottom 212 of the box 210 slightly forwardly of the midpoint of the bottom 212. Accordingly, the center of gravity of the box 210 is located very close to the pivot point of the wheelbarrow apparatus. The load is thus distributed in such a fashion as to be carried substantially directly over the axle 84 of the wheel 80. This enhances the lifting, maneuvering, and moving of the wheelbarrow apparatus, and provides that such lifting, maneuvering, and moving may be accomplished with a minimum effort or minimum force exerted on the handles 40 and 60. With a substantial portion of the box 210 disposed forwardly of the axle 84, the weight of the load offsets itself to minimize the effort or force required to be exerted on the handles in order for the user to maintain control of the apparatus, regardless of the weight of the load in the box 210, and to move and maneuver the apparatus, as desired.

In FIG. 4, the wheelbarrow apparatus 10 is shown tilted or tipped rearwardly in a stable position, resting on the leg bracket 140 and on the handles 40 and 60. Since FIG. 4 is a side view, the right handle 60 and the right leg 160 are not shown, and only the left handle 40 and the left leg 150 are shown.

In FIG. 5, the wheelbarrow apparatus 10 is shown in a tilted forward position, or dump position, with respect to the box 210. Again, the wheelbarrow apparatus 10 is in a stable position as shown in FIG. 5. The stable position is defined by the round front nose member 14 and the front wall 230 of the box 210. The bumper 24, secured to the rounded portion 14 of the front frame member 12, is disposed on the ground 2, while the entire width of the front wall 230 is also disposed on the ground, thus defining a stable position of the apparatus 10. It will be noted that the wheel 80 does not contact the ground in the orientation of FIG. 5.

FIG. 6 is a top view of the wheelbarrow apparatus 10. FIG. 6 illustrates the relative length and width of the box 210 and the angular orientation of the walls with respect to the bottom 212. The legs 150 and 160 extend rearwardly of the rear wall 222 of the box 210 and inside or within the overall width or distance between the handles 40 and 60 at their rear end portions 50 and 70, respectively. That is, the width of the legs, or the distance between the legs 150 and 160, is less than the width of the box 210 and less than the width of, or distance between the handles 50 and 70.

The various compound curvatures of the handles 40 and 60 have been discussed above, and the vertical curvature of the handles has been discussed in conjunction with the illustrations of FIGS. 3, 4, and 5. Since FIGS. 3, 4, and 5 are side views, the vertical curvatures are best shown in those Figures. In FIGS. 1 and 2, which are perspective views, the lateral curvature of the handles has been discussed as illustrated somewhat, but FIG. 6, which is a top view, best illustrates the lateral curvature of the handles. It will be noted that the front portions 42 and 62 of the handles 40 and 60, respectively, extend slightly outwardly, with respect to each other, in a diverging relationship. Between the front portions 42 and 62 and the rear portions 50 and 70, the handles curve outwardly and then inwardly to terminate in a substantially parallel relationship. The outward and then reverse curvature of each handle somewhat parallels the vertical curvature, such as illustrated in FIGS. 3, 4, and 5, in that compound curves are involved. First there is an outward curve, then a short, straight transition portion, and then an inward curve, in each handle.

Another feature of the wheelbarrow apparatus 10, best illustrated in FIG. 3, but also shown to a greater or lesser extent in FIGS. 2, 4, and 5, is the location of the handle ends 50 and 70, as indicated by the grips 52 and 72, respectively. It will be noted that the handles terminate above the top of the side walls of the box 210. The cargo or load in the box is accordingly disposed beneath the handles as gripped by a user. The control of the wheelbarrow apparatus by a user is enhanced by the location of his control points, where his hands grasp or hold the handles by having the weight of the load disposed beneath or lower than his hands and by having the weight distributed over a relatively large area. Moreover, less vertical lifting of the apparatus is required because of the vertical distance upwardly which the handles extend, as opposed to prior art apparatus, such as the conventional "contractors" wheelbarrow which has been mentioned above.

What is claimed is:

1. Wheelbarrow apparatus, comprising, in combination:
   frame means, including
      a generally u-shaped frame member,
      a first and a second side arm connected to the u-shaped frame member and extending rearwardly from the u-shaped member;
   handle means connected to the side arms for lifting and maneuvering the apparatus, including
      a first handle secured to the first side arm, and
      a second handle secured to the second side arm, both first and second handles extending rearwardly and upwardly from the frame means;
   a wheel secured to the frame means;
   stabilizer means including a first stabilizer and a second stabilizer secured to the frame means forwardly of the wheel, and each stabilizer extends outwardly and downwardly for contacting the surface on which the wheelbarrow apparatus is disposed for preventing the wheelbarrow from tipping completely over;
   box means for receiving a load secured to the frame means and disposed over the wheel, including
      a generally retangular bottom, a substantial portion of which is disposed forwardly of the wheel, and
      first, second, third, and fourth side walls secured to the bottom and extending upwardly therefrom;
   bracket means for securing the box means to the frame means, including
      forward bracket means secured to the frame means and extending upwardly from the frame means to the box, and
      rear bracket means secured to the frame means and extending upwardly to the box; and
   leg means secured to the frame means adjacent the rear bracket means for supporting the wheelbarrow apparatus at the rear thereof when the wheelbarrow apparatus is in a static position, including
      a first leg disposed adjacent the first side arm and the first handle and extending downwardly,
      a second leg disposed adjacent the second side arm and the second handle and extending downwardly and spaced apart from the first leg.

2. The apparatus of claim 1 in which the first and second stabilizers of the stabilizer means extend outwardly in opposite directions from each other.

3. The apparatus of claim 2 in which the first and second stabilizers of the stabilizer means extend downwardly from the frame means a distance less than the distance from the frame means to the bottom of the wheel.

4. The apparatus of claim 3 in which the first and second stabilizers of the stabilizer means each include a pad on which the wheelbarrow apparatus may rest for providing stability for the wheelbarrow apparatus in a tipped position.

5. The apparatus of claim 1 in which the box means is disposed above the frame means and spaced apart from the frame means by the bracket means to allow the box means to be nearly horizontally disposed in a static position.

6. The apparatus of claim 5 in which the box means is relatively wide and shallow for distributing the load over a relatively large area.

7. The apparatus of claim 1 in which the first and second side arms of the frame means extend outwardly and upwardly from the u-shaped frame member.

8. The apparatus of claim 7 in which the first and second handles of the handle means extend upwardly and outwardly from the first and second side arms of the frame means and terminate above the side walls of the box means when the wheelbarrow apparatus is in the static position.

* * * * *